United States Patent [19]

Barnes

[11] 4,061,819

[45] Dec. 6, 1977

[54] PRODUCTS OF CONVERTED LIGNOCELLULOSIC MATERIALS

[75] Inventor: Derek Barnes, Vancouver, Canada

[73] Assignee: MacMillan Bloedel Limited, Vancouver, Canada

[21] Appl. No.: 713,507

[22] Filed: Aug. 11, 1976

Related U.S. Application Data

[60] Continuation of Ser. No. 502,065, Aug. 30, 1974, abandoned, which is a division of Ser. No. 237,705, March 24, 1972, abandoned.

[51] Int. Cl.[2] .............................................. B32B 5/12

[52] U.S. Cl. .................................... 428/294; 428/218; 428/114; 428/295; 428/332; 428/528; 156/62.2

[58] Field of Search ............... 428/114, 218, 294, 326, 428/332, 528; 156/62.2

[56] References Cited

U.S. PATENT DOCUMENTS

| | | | |
|---|---|---|---|
| 2,429,235 | 10/1947 | Miskelly et al. | 428/294 |
| 2,798,019 | 2/1957 | Verbestel | 428/114 |
| 2,817,617 | 12/1957 | Rogers | 161/162 |
| 3,164,511 | 1/1965 | Elmendorf | 428/294 |
| 3,440,189 | 4/1969 | Sharp | 156/62.2 |
| 3,639,200 | 2/1972 | Elmendorf | 161/162 |
| 3,649,397 | 3/1972 | Peters | 428/528 |
| 3,705,837 | 12/1972 | Breslauer | 161/168 |

FOREIGN PATENT DOCUMENTS

| | | |
|---|---|---|
| 1,015,804 | 1/1966 | United Kingdom. |

OTHER PUBLICATIONS

"The Relation between the Dimensions and Geometry of Wood Particles and the Mechanical Properties of Wood Particles", Stofko, Institute of Paper Chemstry, 1960 (T-1092).

Elmendorf, "Wood Fibers from Veneer Waste" Paper Trade Journal, Feb. 1950, pp. 29-31.

*Primary Examiner*—William R. Dixon, Jr.

*Attorney, Agent, or Firm*—Larson, Taylor and Hinds

[57] ABSTRACT

A method of converting lignocellulosic materials into various useful products, the method being controlled to produce the different products in accordance with the demand for them in the market. All of the original lignocellulosic material is used in this method. An important product obtained from this method is lumber engineered and dimensioned in accordance with the demand, and having predetermined characteristics.

7 Claims, 10 Drawing Figures

Figure 1:
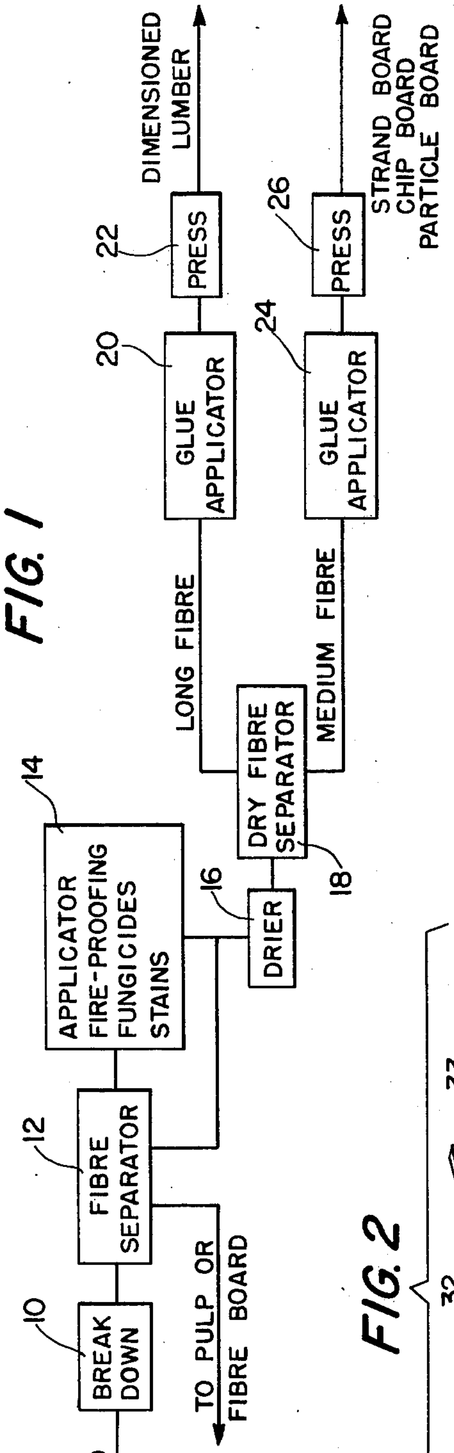

FIG. 4
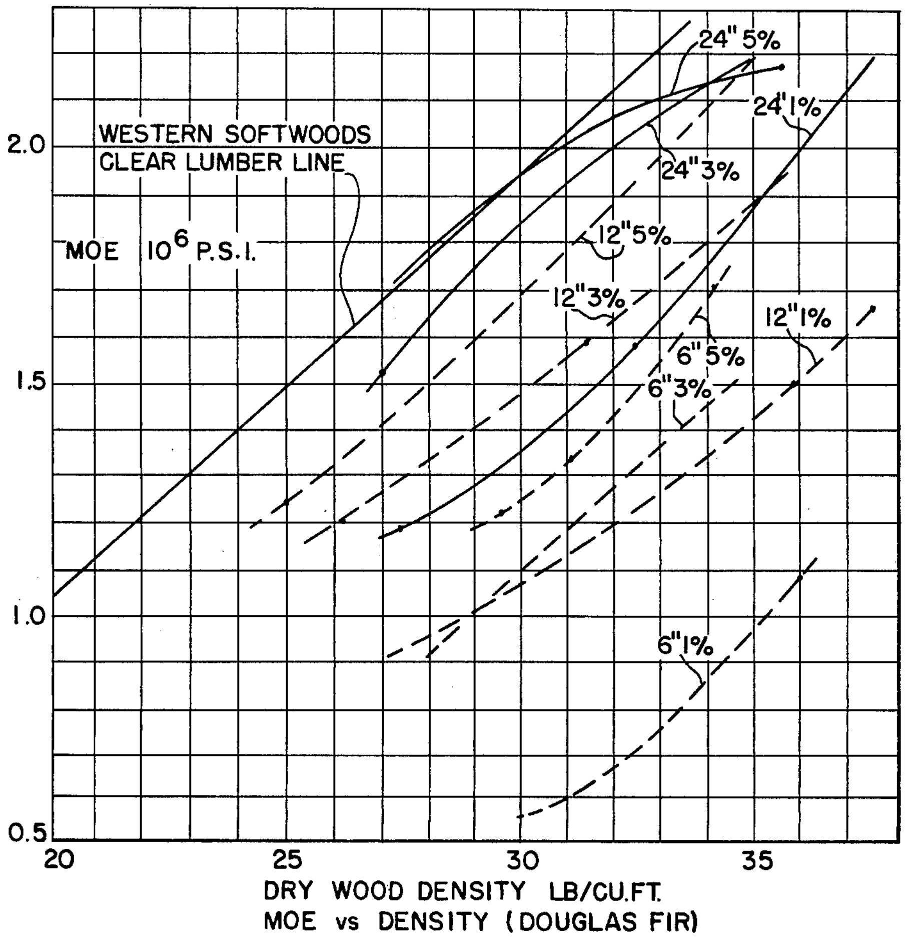
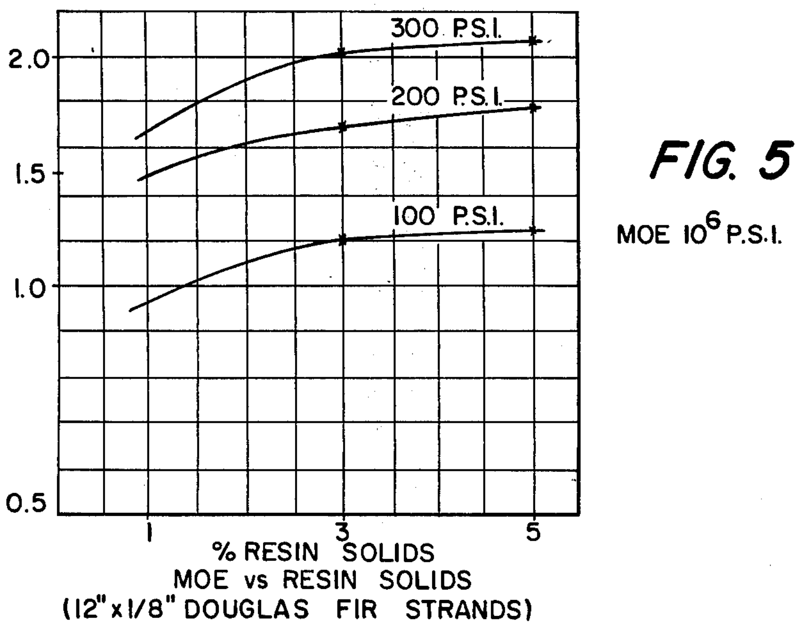
FIG. 5

FIG. 6
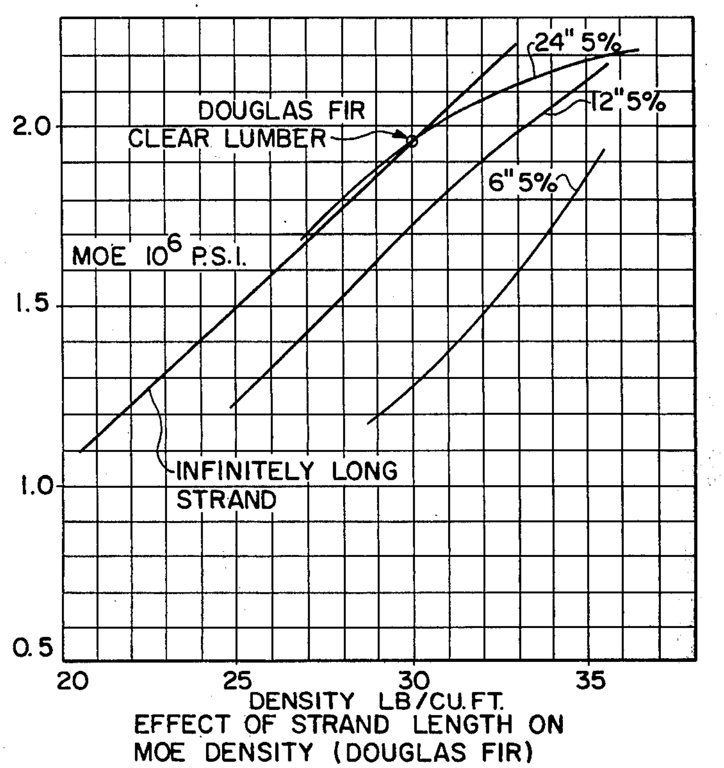
EFFECT OF STRAND LENGTH ON MOE DENSITY (DOUGLAS FIR)
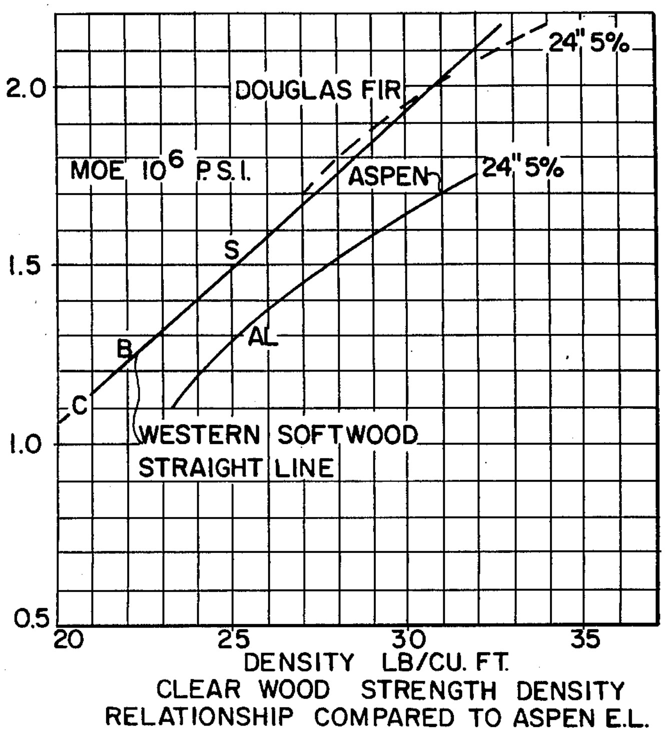
FIG. 9
CLEAR WOOD STRENGTH DENSITY RELATIONSHIP COMPARED TO ASPEN E.L.

RESIDUAL SWELL IN COMPRESSED FACE DIRECTION (DOUGLAS FIR)

RESIDUAL THICKNESS SWELL IN COMPRESSED FACE DIRECTION EFFECT OF SPECIES

PRODUCTS OF CONVERTED LIGNOCELLULOSIC MATERIALS

This is a continuation, of application Ser. No. 502,065 filed Aug. 30, 1974 now abandoned which is in turn a division of application Ser. No. 237,705 filed Mar. 24, 1972 now abandoned.

This invention relates to a method of converting lignocellulosic materials into useful products without waste, and products of this method.

In the past there has been a great deal of waste in the utilization of lignocellulosic materials, and particularly wood. During logging operations, the limbs of trees are cut off and are burned or left around to decay. In the mills a large percentage of the wood is lost in sawdust, trimmings or cuttings, and the like. Some effort has been made to reduce the amount of sawdust, and to convert the trimmings and cuttings into chips for use in manufacture of pulp. However, the waste is still very great. In addition to this, many small trees are left behind in logging operations since it is uneconomical to cut and handle them, and many species of trees and shrubs are not used at all since they are not considered to be suitable for the manufacture of lumber.

Many sources of lignocellulosic fiber are not commercially utilized for construction purposes because of inherent characteristics that make them economically unattractive, such as small diameter, low density, low resistance to decay, poor grain properties, and poor strength properties. In many areas of countries such weed species can constitute a significant, if not the major, part of the available wood resource. In British Columbia, Canada, Western red cedar constitutes a significant part of the coastal forest, something of the order of 22%. However, its strength properties and pulp yield characteristics are such as to make it of little commercial value compared to such contiguous species as Douglas fir and hemlock. In some tropical areas, such as Malasia, the desired species may occur at such a low frequency per acre as to allow for only the most primitive segregation and cutting operations. In other areas, the dominant vegetation consists of bushes, reeds, and other woody plants not suited for conventional conversion into construction products. In addition to this non-utilization of non-processed wood fiber, is the very large amount of waste wood generated in the most highly automated, high yield log conversion systems. It is estimated that the waste wood amounts to about 45% of the total tree, taking into account all low value uses of residues for fuel and soil conditioning.

The present invention contemplates the production of construction materials, such as lumber, various types of panels, and the producton of pulp, from any source of lignaceous cellulosic fiber. The general idea is to break down any lignocellulosic material into slivers, fibers or strands by any suitable means, such as by slicing, crushing, shaving, peeling or the like. The aim in the breakdown is generally to produce as long fibers as possible. During the breakdown there are produced small or fine particles, medium length strands and long length strands. The fine particles are utilized in the manufacture of pulp and/or fiber boards, the medium length are used in the manufacture of strand boards, chip boards and/or particle boards, and the long lengths are manufactured into dimensioned lumber and/or board products. It is this production of the dimensioned lumber that makes the process or method practical, since the lumber is engineered to give desired characteristics, regardless of the type of the basic lignocellulosic material. An important feature of this process is the fact that it can be operated to produce the various products in accordance with the market demand. If the demand for pulp is up and for the other products is down, more of the material can be converted into short lengths or particles. On the other hand, if the demand for strand boards, chip boards or particle boards is up, the percentage of medium lengths can be increased at the expense of the long lengths. However, if the demand for lumber is up, as many long length are produced as possible. As the lumber products have the highest commercial value, it is usually desirable to aim to produce the highest possible amount of long length fibers.

The general advantages resulting from this process carry on into the dimensioned lumber field. The lumber can be produced in size and characteristics in accordance with the market demand. For example, if there is a relatively great demand for two by fours, a large percentage of the long fibers can be converted into these. On the other hand, if other boards or timbers are particularly required, the production can be concentrated on these.

This is a concept that can revolutionize the wood product producing industry. Heretofore, the trees were converted into the best or highest paying products possible. However, with the prior production methods, the control of the type of lumber produced is very limited so that if a large number of, say, two by fours are in demand, the operation will also result in the production of large number of boards or lumber of different sizes which may not be required at the moment. Thus, a producer can end up with a large inventory of boards not needed at the moment when he tries to fulfill the sudden demand for boards or lumber of other dimensions.

The main product of this process is the dimensioned lumber. It is possible to make any number of boards of the same or different dimensions, and these can be given desired characteristics regardless of the original source of material. The term "board" as used herein is intended to include all kinds of boards, timbers and lumber of any desired directions.

As stated above, the lignocellulosic materials can be broken down in any desired manner. The fibers are separated by length into those fractions most suitable for the required end use, treated with such additives as may be needed to give the required resistance to decay and fire, dried either before or after the addition of adhesives, or they can be left undried, and then combined with a binding material, and, possibly, combined with non-cellulosic fibers, such as glass, metals and plastics, and formed into a mass and either cast, molded, extruded or pressed into the desired end product.

Any method of breaking up the raw lignacious cellulosic material into fibers will develop a wide range of fiber lengths and diameters. The most profitable and useful end use is a lumber product suitable for construction purposes, followed by a strand panel board with strength properties similar to plywood, chip boards, and lastly the particle board for essentially non-structural uses. A possible segregation of the particles in the following lengths for the specified purposes is as follows:

Dimensioned lumber; 6 inches to 4 feet
Strand board; 2 inches to 6 inches
Chip boad; ½ inches to 2 inches
Particle board; Less than ½ inch Pulp; Less than ½ inch An excess of any fraction can be broken down into lower lengths.

All of the products that can be produced by the present process, excepting the dimensioned lumber, are produced by known processes.

However, this invention contemplates the production of dimensioned lumber from any lignacious cellulosic material. Use of this concept will significantly affect the conventional forestry practices from the present emphasis upon merchantable lumber to that of a maximum yield of woody fiber per acre, and will result in a true tree farming approach utilizing fast growing, short cycle, high yield species rather than the present slow growing long cycle species.

As stated above, one of the advantages of the present process is the utilization of non-commercial "weak" species in the production of good grade lumber. Some species of wood, such as aspen and alder, are considered low value species and little used for commercial purposes because of their very low yield of merchantable lumber per/unit/acre of logs. This low yield is due to the small size of log, the low strength properties, and the incidents of compression and tension wood causing warping and twisting. Utilization of these species in the manufacture of the various products in accordance with this process makes very large volumes of wood available for commercial use. A large percentage of the waste from the standard logging sawmill and manufacturing procedures can be converted to dimensioned lumber having more value than the use of these material for pulping. Smaller trees and shorter harvesting cycles can be used in order to give an increase in wood yield from given acreage.

The present process lends itself to the production of a uniform density material with guaranteed strength and durability properties, free from the inherent defects of normal lumber-knots, splits and density variations.

The strength properties of wood increase with increasing density. All species for which data is at present available show this increase. This relationship of strength properties to density is of major commercial significance in the use of lumber, resulting in allowable design stress values significantly below that of the average strength values of the species involved. Variations in the density of wood are due to variations in its structure and the presence of extraneous constituents. The structure is characterized by the proportional amounts of different cell types, such as fibers, tracheids, vessel ducts, and rays, and by their dimensions. Hereditary tendencies, physiological and mechanical factors, position in the tree trunk, all affect the density of the wood. The relationships are very complex and not well understood. The result is a wide variation in density within any one species which can be as large as a factor of 2 to 2½. The dimensioned lumber of the present invention overcome these inherent variations in normal lumber properties.

By choice of compressed density, resin solids and strand geometry, particular properties can be imparted to engineered or dimensioned lumber. A range of lumber-like products can thus be engineered to use specifications, and these are competitive on an engineering basis with solid lumber, metals, plastic and concrete.

If desired, fire retardants, preservatives, colorants and the like can be added to the particles or strands used in the production of the dimensioned lumber.

The engineered or dimensioned lumber produced by this process is made up of cellulosic fibers or strands ranging from about 6 inches to about 4 feet in length, and having a width of about 0.05 to 0.25, and a thickness of about 0.05 to about 0.5 inch. These fibers are coated with adhesive in standard coating equipment, such as drum applicators or curtain applicators. A water insoluble structural glue, such as phenol formaldehyde, is used to coat the fibers, although any suitable type of glue can be used. The coated fibers are arranged in bundles and then subjected in presses to pressures sufficient to produce a finished product having predetermined dimensions and density. The pressures and temperatures used are sufficient to produce the desired density. For example, pressures of from about 100 to about 400 psi have been found to be suitable, and the fibers are subjected to a high enough temperature for a time sufficient to produce a temperature of at least 212° F withhin the product. For example, a temperature of 300° F for up to 30 minutes has produced desirable products, but this time can be reduced. If high frequency energy is used for providing the heat, the pressing can be done in around one minute.

Figure 7:
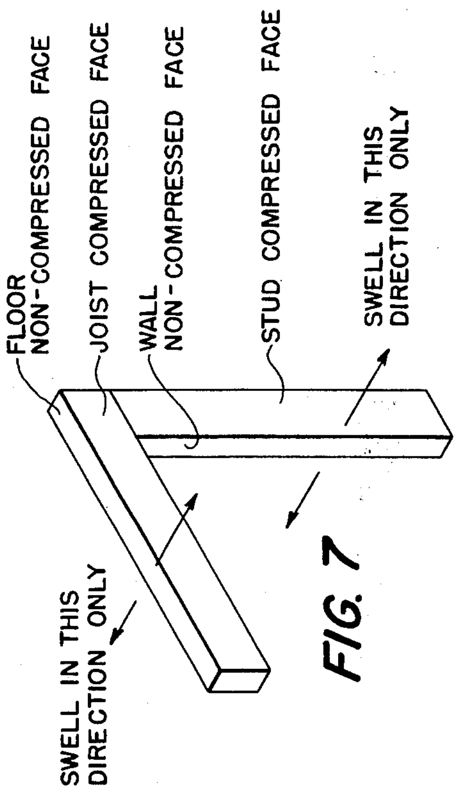
Figure 2:
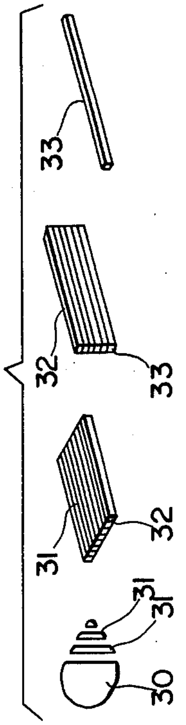
Figure 3:
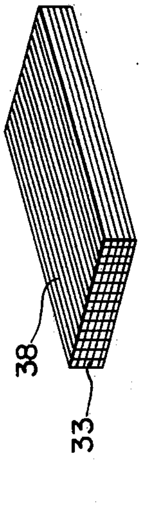
Figure 8:
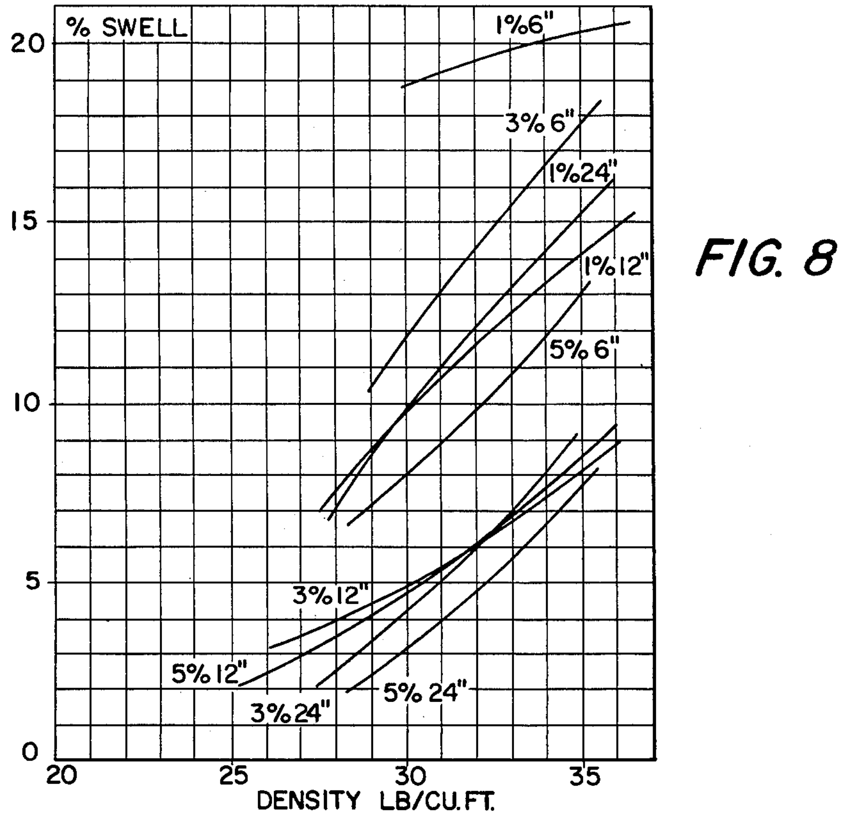
Figure 10:
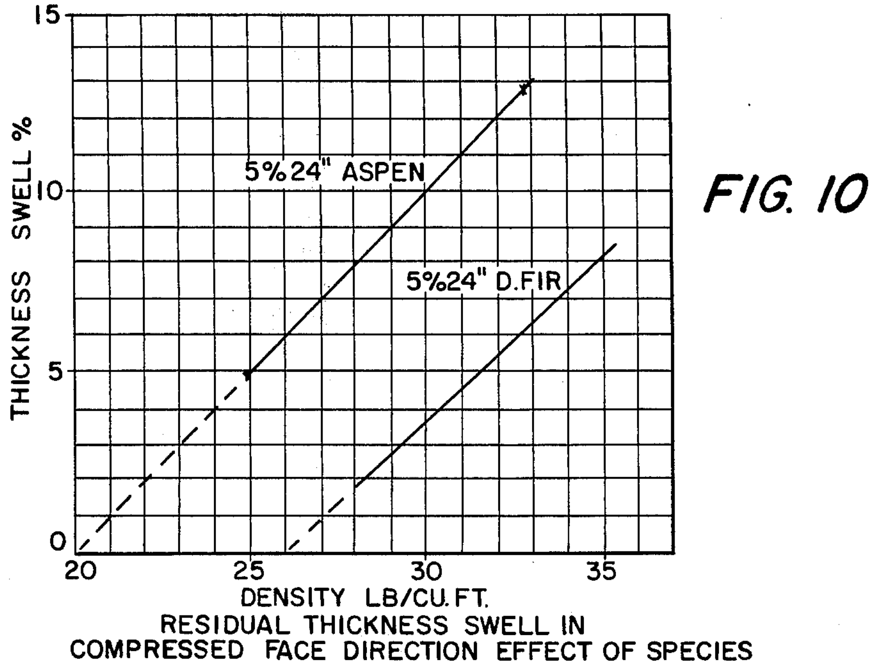

Referring to the accompanying drawings,

FIG. 1 diagrammatically illustrates apparatus for carrying out the method in accordance with this invention, FIG. 2 illustrates one way of producing lignocellulosic material to useful fiber lengths, FIG. 3 illustrates a piece of dimensioned lumber made in accordance with this invention, FIG. 4 is a graph comparing the modulas of elasticity to density in engineered lumber, FIG. 5 is a graph illustrating the relationship of the resin solids used relative to the modulas of elasticity, FIG. 6 is a graph illustrating the effect of strand of fiber length, FIG. 7 diagrammatically illustrates the direction of springback of some forms of dimensioned lumber, and FIGS. 8, 9 and 10 are graphs illustrating specified characteristics of the dimensioned lumber.

FIG. 1 diagrammatically illustrates apparatus for carrying out the present invention. The lignocellulosic material, such as logs, roots, branches, waste wood, shrubs and the like, are fed to a breakdown device 10 where they are sliced, crushed or otherwise broken down into fibers. It is desirable to produce long strands or fibers for use in the manufacture of dimensioned lumber. For example, these can be from 6 inches to 4 feet in length, 0.05 to 0.25 inch in width, and 0.1 to 0.5 inch in thickness. In the general breakdown there will be fibers of medium length and very short fibers. The general aim is to produce as many long fibers as possible since these are used in the production of dimensioned lumber which is the most valuable product for the market. It is at this point that the final output of the process can be controlled. The short fine fibers are used for pulping or fiber boards, while the medium length fibers are used in the manufacture of strand boards, chipboards, particle boards and the like. If the demand for pulp and/or these different boards goes up relative to the demand for dimensioned lumber, more short fibers and/or medium fibers are produced at the breakdown device 10.

The fibers suitable. device 10 go to a separator 12 which separates out the short length fibers to be used in the manufacture of fiber boards or pulp, or for any other purpose for which short length fibers are suitable.

Some or all of the medium length and long length fibers may be directed to an applicator 14 where they are treated with fire proofing material, insecticides, preservatives, stains or the like before being sent on to a dryer 16. Some or all of these fibers can be by-passed directly to dryer 16. The moisture content of the fibers is reduced to the desired extent for the production of the final product. If desired, the medium length fibers may be separated from the long length fibers before they reach dryer 16, in which case the different groups of fibers would be separately dried in accordance with the demand.

In this example, the fibers from dryer 16 go to a separator 18 which separates them into the long fibers and the medium fibers. The long fibers go to a glue applicator 20 which may be in any desired form, such as a drum applicator or a curtain applicator, and from here they go to a press or mold 22 which presses them under heat and pressure into lumber of desired dimensions and the desired density. There is another control at this point, that is, the dimensions of the lumber produced is in accordance with the demand. For example, if there is a great demand for two by fours, the percentage of these would be high relative to boards of other dimensions for which the demand was not so great. Although this diagram merely shows one press or mold 22, it is obvious that there could be several presses so that boards of different dimensions could be made at the same time.

Separator 18 separates out the medium fibers from the long fibers, and these are directed to a glue applicator 24, whence they travel to a press 26 which produces the type of boards required, such as strand boards, chipboards, particle boards, and the like. Here again, although one press only is shown, there may be several. In addition to this, the "press" is intended to mean any system necessary to produce the desired particle-type board.

What actually happens in this method or process is that the original material is broken down into fibers of different lengths, and then these are reconstituted into dimensioned lumber, particle-type boards, pulp and the like. With this arrangement, there is no waste. In addition, the process is geared to handle all of the particles produced from the original material, regardless of their length, and regardless of whether the lengths are accidentally or intentionally produced.

FIG. 2 illustrates one way of reducing lignocellulosic material, such as a log, to useful fiber lengths. A log 30 is cut by suitable slicing material into slices 31, and then each slice 31 is cut into relatively thin pieces 32 which extend the length of slice 31. Each piece 32 has a desired width, such as 0.05 to 0.25 inch. Then each piece is cut transversely into strands 33 of desired thicknesses, for example, 0.05 to 0.5 inch. These preferably are the length of the pieces 32. It is obvious that during this slicing or cutting process, there will be a lot of fibers which are considerably shorter than the strands or fibers 33. As stated above, the medium length fibers can be used in the production of particle-type boards, and the short fibers can be used in the production of pulp, or for other desired purposes.

FIG. 3 illustrates a piece of dimensioned lumber or board 38 made up of strands or fibers 33. These strands or fibers, after being coated with a suitable adhesive, are laid side by side and then pressed under heat and pressure into a board of desired dimensions, such as, for example, a two by four. These strands can extend the full length of the board, as shown, or each strand may extend only part way through out the length of the board. The strands are laid side by side, but as these are of random dimensions and lengths, they interlock to a degree so that there are not straight glue lines extending from one surface to the other of the board. The density of the finished product is determined by the amount of pressure and heat used in the press. This is another advantage of this method, that is, the boards produced can be not only of desired dimensions, but they can be made in desired densities in accordance with the purpose for which they are designed. In addition, it is possible to subject the long strands to a continuous pressing operation so that boards of any desired length can be produced. As the strands are interlaced to a certain degree, any length of board can be produced.

Although the lengths of the strands for different purposes can vary, the following is an indication of pratical lengths for the different purposes:

Engineered lumber; 6 inches to 48 inches
Strand board; 2 inches to 6 inches
Chipboard; ½ inch to 2 inches
Particle board; Less than a ½ inch
Pulp chips and sawdust;

In the manufactured or dimensioned lumber, the resistance of the glueline to horizontal shearing forces is proportional to the length of the fiber to which the stress is being transmitted to the glueline. It is also inversely proportional to the thickness of the glueline which is related to the fiber thickness to the extent that the degree to which a "closest packing" condition of the fibers is achieved. The optimum resin content for any set of variables is that at which maximum strength properties are obtained, all else being equal. Theoretically, too little resin gives insufficient coverage, and too much resin causes thick gluelines, thereby reducing strength. Variables affecting the optimum resin content are the fiber geometry and the pressure applied during the curing of the resin.

The thing that makes this process an economical success is the fact that engineered or dimensioned lumber can be made with equal strength to that of top structural grade Douglas fir lumber. This can be either on an equal density basis using optimum fiber geometry and adhesive content, or it can be on an increased density basis using less favourable fiber geometry and adhesive content. The strength of the engineered lumber is essentially independent of the raw material species, but increased "springback" with moisture absorption occurs with the use of low density species. The durability and stability are mainly controlled by adhesive content.

STRENGTH-DENSITY RELATIONSHIP FOR ENGINEERED LUMBER

FIG. 4 shows plots of the strengths (Modulus of Elasticity, MOE) against compressed density for engineered lumber made from ⅛ inch Douglas fir strands under the following conditions:

Strand length; 6 inches, 12 inches, 24 inches
Resin solids; 1, 3, 5% (Phenol formaldehyde solids to dry wood percentage
Press pressures; 100 to 400 psi These plots show that for any given conditions of strand length and resin solids the strength of the engineered lumber increases with increasing compressed density. The rates of increase, i.e. the slope of the strength with density are equal (the lines are parallel).

This linear increase of strength with the density is characteristic of wood, i.e. if the clear wood strengths of the commercial western softwoods (USDA "Wood Handbook", p. 75–77) are plotted against ovendry density a straight line is obtained shown by the heavy straight line in FIG. 4. This line has the same slope as the engineered lumber lines and acts as an upper limit of those lines.

It will be seen that the 24 inches, 5% line is coincident with the limiting wood strength line. It is believed that no engineered lumber can be made with greater strength at a given density than this clear wood strength limiting line.

In FIG. 1 the MOE requirements of two grades of Douglas fir lumber, select structural and No. 3 structural are shown by horizontal lines (Standard Grading Rules No. 16, WCLIP, p. 135). This shows how engineered lumber can be made with equal strength to these grades for all conditions of strand length and resin solids which cross the horizontal strength lines. For a given grade increased density is required to compensate for shorter strand lengths and reduced resin solids.

STRENGTH VERSUS % RESIN SOLIDS

FIG. 5 shows that the optimum resin solids percentage is in the range 3–5%. The plots at equal press pressure (and resulting density) level off in this range, any increment in resin solids giving only a marginal increase in strength. This resin solids range is for ⅛ inch square cross section strands. Increasing resin solids would be required for smaller strand section because of increasing specific surface area in the engineered lumber and vice versa with large strand cross sections.

EFFECT OF STRAND LENGTH ON STRENGTH

Lines taken from FIG. 4 are plotted in FIG. 6 to show the effect of strand length on strength at equal resin solids (5%). The 24 inch line is almost coincident with the clear wood strength line, the 12 inch line is about 20% below the clear wood strength line, and the 6 inch line is about 50% below. The clear western softwood MOE density line can be assumed equivalent to engineered lumber with infinitely long strands. Thus the 24 inch strand lengths are the best approximation to infinite strand lengths. The 24 inch length on an ⅛ inch square cross section corresponds to a length to diameter ratio of 200:1 which has been established as the optimum fiber geometry for glass fiber composites. (Motavkin, A. V., et al "Choice of Optimum Structure of Glass Fiber Based Materials", Mekhanika Polimerov 5 (2): 288–297 (1969) ).

THICKNESS SWELL OF ENGINEERED LUMBER AFTER MOISTURE ABSORPTION

The compression of the engineered lumber to any desired density has a disadvantage of "springback", the permanent residual thickness swelling which occurs on release of the compressive stress with moisture absorption. This "springback" phenomenon is also experienced in particleboard type products. In engineered lumber the thickness swelling and "springback" is dependent on the overcompression above the uncompressed density of the strand bundles (extrapolate the lines back to the density X-axis), the resin solids and the strand geometry. This permanent "springback" of about 5% for optimum strand length and resin solids is not disadvantageous in lumber type applications of floor joists and wall studs where the swelling would be restricted to the smaller dimension direction as shown in FIG. 7.

EFFECT OF SPECIES ON THICKNESS SWELL AND "SPRINGBACK"

FIG. 10 shows the comparison of residual thickness swell in the compressed direction ("springback") of aspen with that of Douglas fir for equal strand length and resin solids conditions. It will be seen from the FIG. that aspen has a greater "springback" than Douglas fir (about 7% more swell for all densities). This difference can be accounted for if the two 5% 24 inch lines are extrapolated back to the density X-axis at 20 and 26 lb/cu. ft. for aspen and Douglas fir, respectively. The 6 lb./cu. ft. difference is approximately equal to the difference clear wood dry densities (30.4 - 23.2 = 7.2) between Douglas fir and aspen.

Thus the influence of species on swelling characteristics can be predicted with reference to the Douglas fir data by comparison of clear wood dry densities and drawing lines parallel to the established Douglas fir standard swell lines.

Engineered or dimensional lumber can be made with any desired strength to above that of the structural grade of a high strength wood species, such as Douglas fir, by using wood fibers obtained from low quality logs and combining fiber length, resin content and final product density. The exact combination of fiber length, resin solids and final pressed density chosen will depend upon the economic and technical situation, such as the fiber length in stock, the cost of the raw materials, and the wood species available. Examples of such combinations to meet various grades are shown in the following Table:

TABLE

| Group | Grade | MOE 1,000,000 | Species | Fiber Length In. | Resin Solids % | Density Lbs/Cu/Ft. |
|---|---|---|---|---|---|---|
| A | Douglas Fir Structural Select and #1 | 1.93 | Douglas Fir | 24 | 5 | 30 |
| | | | | 24 | 3 | 31.2 |
| | | | | 24 | 1 | 35.5 |
| | | | | 12 | 5 | 32.6 |
| | | | | 12 | 3 | 35.6 |
| | | | | 12 | 1 | 40.0 |
| | | | | 6 | 5 | 36.0 |
| | | | Aspen | 24 | 5 | 35 |
| | | | W. Red Cedar | 24 | 5 | 31 |
| | | | | 12 | 5 | 32 |
| | Douglas Fir Structural #2 | 1.74 | | 24 | 5 | 27.0 |
| | | | | 24 | 3 | 29 |

TABLE-continued

| Group | Grade | MOE 1,000,000 | Species | Fiber Length In. | Resin Solids % | Density Lbs/Cu/ Ft. |
|---|---|---|---|---|---|---|
| | | | Douglas Fir | 24 | 1 | 34.5 |
| | | | | 12 | 5 | 30.5 |
| | | | | 12 | 3 | 32.7 |
| | | | | 12 | 1 | 37.5 |
| | | | | 6 | 5 | 34.2 |
| | | | | 6 | 3 | 37 |
| | | | Aspen | 24 | 5 | 31.5 |
| | Douglas Fir Structural #3 and Light Framing Construction Standard and Utility | 1.54 | W. Red Cedar | 24 | 5 | 31.5 |
| | | | | 12 | 5 | 30.5 |
| | | | Douglas Fir | 24 | 5 | 25.0 |
| | | | | 24 | 3 | 27 |
| | | | | 24 | 1 | 31.5 |
| | | | | 12 | 5 | 28 |
| | | | | 12 | 3 | 30.5 |
| | | | | 6 | 5 | 34 |
| | | | | 6 | 3 | 34.5 |
| | | | | 6 | 1 | 40 |
| | | | Aspen | 24 | 5 | 28.5 |
| | | | W. Red Cedar | 24 | 5 | 28 |
| | | | | 12 | 5 | 23.5 |
| B | Pacific Hemlock Structural #3 and Light Framing Construction Standard and Utility. | 1.30 | Douglas Fir | 24 | 5 | 23 |
| | | | | 24 | 3 | 25 |
| | | | | 24 | 1 | 29 |
| | | | | 12 | 5 | 26 |
| | | | | 12 | 3 | 28 |
| | | | | 12 | 1 | 33.5 |
| | | | | 6 | 5 | 31 |
| | | | | 6 | 3 | 32.5 |
| | | | | 6 | 1 | 38 |
| | | | Aspen | 24 | 5 | 25 |
| | | | W. Red Cedar | 24 | 5 | 23.5 |
| | | | | 12 | 5 | 25.5 |

As can be seen, the strength of the engineered lumber can be independent of the raw material species so that weak species, such as Aspen and Western Red Cedar, can be used in the manufacture of the highest strength lumber grades, even though their natural occurring densities of 23.7 and 20.6 lbs/cu. ft., respectively, would normally relegate them to the lowest strength grade of 1.000 MM psi MOE. The actual volume of dry fiber required per MFBM of engineered lumber will depend upon the required grade, the density of the wood species, the required density of the engineered lumber for that species, and the length of the fibers. In practice, it is possible to mix species and fiber lengths in various proportions to make the most effective use of the available raw material.

I claim:

1. A discrete dimensioned structural lumber product comprising adhesively bonded, substantially straight wood strands having lengths of at least 12 inches, average widths of 0.05 inch to 0.25 inch, and average thickness of 0.05 inch to 0.5 inch, said strands being disposed, side by side lengthwise of the lumber product in substantially parallel relationship with adhesive bonding adjacent strands, the total amount of adhesive solids in said lumber product being from 1% to 5% by weight, said lumber product having a modulus of elasticity for a given dry wood density within the boundaries in FIG. 4 of the curve of western softwood clear lumber as an upper limit of modulus of elasticity for a given dry wood density and as a lower limit of modulus of elasticity for a given dry wood density the curve for 24 inch fiber length 1% resin solids.

2. A discrete dimensioned structural lumber product according to claim 1 wherein said lumber product has a modulus of elasticity of at least 1.30 × $10^6$ p.s.i. and a dry wood density of not more than 40 lbs. per cubic foot.

3. A discrete dimensioned structural lumber product according to claim 1 wherein said lumber product has a modulus of elasticity within the range of 1.17 to 2.2 × $10^6$ p.s.i.

4. A discrete dimensioned structural lumber product consisting of adhesively bonded, substantially straight wood strands having lengths of at least 12 inches, average widths of 0.05 inch to 0.25 inch, and average thickness of 0.05 inch to 0.5 inch, said strands being disposed, side by side lengthwise of the lumber product in substantially parallel relationship with adhesive bonding adjacent strands, the total amount of adhesive solids in said lumber product being from 1% to 5% by weight, said lumber product having a modulus of elasticity for a given dry wood density within the boundaries in FIG. 4 of the curve for western softwood clear lumber as an upper limit of modulus of elasticity for a given dry wood density and as a lower limit of modulus of elasticity for a given dry wood density the curve for 24 inch fiber length 1% resin solids.

5. A discrete dimensioned lumber product according to claim 4 wherein the strands are at least ⅛ inch thick and at lest ⅛ inch wide.

6. A discrete dimensioned lumber product according to claim 4 wherein the dry wood density of the lumber product is from 23 to 40 pounds per cubic foot.

7. A discrete dimensioned lumber product according to claim 4 wherein the length of the strands is at least 24 inches.

* * * * *